United States Patent Office.

WILLIAM H. H. IRWIN, OF PHILADELPHIA, PENNSYLVANIA.

Letters Patent No. 100,039, dated February 22, 1870; antedated February 5, 1870.

IMPROVED COMPOUND FOR CURE OF COUGHS, COLDS, &c.

The Schedule referred to in these Letters Patent and making part of the same.

To all whom it may concern:

Be it known that I, WILLIAM H. H. IRWIN, of Philadelphia, in the county of Philadelphia, and State of Pennsylvania, have invented a new and improved compound for Coughs, Colds, &c.; and I do hereby declare that the following is a full, clear, and exact description of the ingredients and proportions used in preparing the same.

The object of my invention is to make, by combining the ingredients hereinafter set forth, a compound that will cure consumptive coughs, colds, &c.

To enable those skilled in the art to make and use my invention, I will now proceed to describe its composition and proportions.

Take of pure strained honey, one (1) fluid ounce; pure pine-tree tar, one (1) fluid ounce; antimonial wine, five (5) drops; one (1) fresh egg, with the white and yellow of the same thoroughly mixed.

These articles are thoroughly incorporated by mixing and stirring for one hour, after which it is bottled and ready for use.

The dose for adults is one tea-spoonful three or four times a day, and in proportion for children or infants.

I do not wish to limit myself to exact proportions herein set forth, as more or less of each of the ingredients may be used, although the compound made and proportioned as specified has been found in practice to be the most beneficial for the purposes intended.

Having thus described my invention,

What I claim, and desire to secure by Letters Patent of the United States, is—

A compound for coughs, colds, &c., composed of the above-named ingredients, in or about the proportions aforesaid.

In testimony whereof I have hereunto signed my name in the presence of two subscribing witnesses.

WILLIAM H. H. IRWIN.

Witnesses:
CHARLES H. EVANS.
GEO. E. NICHOLS.